United States Patent [19]
Clarke et al.

[11] 3,834,456
[45] Sept. 10, 1974

[54] AQUEOUS ORGANIC HEAT-SINK FLUIDS

[75] Inventors: Ewart C. Clarke; David N. Glew, both of Sarnia, Ontario, Canada

[73] Assignee: The Dow Chemical Company, Midland, Mich.

[22] Filed: July 3, 1972

[21] Appl. No.: 268,465

[52] U.S. Cl. ............... 165/104, 252/67, 252/70, 260/676 H
[51] Int. Cl. ..................... C09k 3/18, F28d 13/00
[58] Field of Search ............... 165/104; 252/70, 67; 126/400; 62/430, 439; 280/676 H

[56] References Cited
UNITED STATES PATENTS

| | | | |
|---|---|---|---|
| 2,136,385 | 11/1938 | Kaufman | 252/70 X |
| 2,191,198 | 2/1940 | Gould | 165/104 X |
| 2,515,298 | 7/1950 | Feldman | 126/400 X |
| 2,677,243 | 5/1954 | Telkes | 252/70 X |
| 3,449,241 | 6/1969 | Gebhart et al. | 280/676 H X |

*Primary Examiner*—Leon D. Rosdol
*Assistant Examiner*—Harris A. Pitlick
*Attorney, Agent, or Firm*—Arthur J. Young

[57] ABSTRACT

This invention comprises aqueous organic hydrate compositions each of which melts at an invariant temperature and has a large latent heat of fusion associated with its liquid-solid phase change coupled with small volume changes. The compositions are, at normal temperatures, single phase, liquid, water-rich solutions containing at least one organic component. Such compositions are particularly suitable for use in thermal or heat-sink structures designed for environmental conditions experiencing large heat transfer fluxes.

13 Claims, No Drawings

AQUEOUS ORGANIC HEAT-SINK FLUIDS

BACKGROUND OF THE INVENTION

1. Field of the Invention

The invention relates to compositions which are particularly suitable for use in thermal or heat-sink structures, with particular reference to single phase, liquid, water-rich heat-sink solutions containing at least one organic component. The physical characteristics of these aqueous, organic compositions are those of mobile, single-phase fluids which freeze to yield homogeneous crystalline ice-like solids.

2. Description of the Prior Art

In general the use of heat-sink fluids in artificial thermal or heat-sink structures to regulate the temperature of a given environment is well known in the prior art. Artificial thermal or heat-sink structures are often used where seasonal temperature conditions and the specific heat capacity of natural environmental elements or man-made constructions precludes continued uninterupted use thereof or where significant degradation of natural elements or man-made constructions is caused by varying climatic influences as, for example, illustrated in a copending application entitled "Trafficked Surfaces" by John S. Best, Ser. No. 112,635, filed Feb. 4, 1971 and now U.S. Pat. No. 3,722,378.

Prior art compositions which are utilized to control the temperature of a specific environment, such as the heat-sink fluids used in heat-sink structures, generally fall within two categories. The first pertains to constant temperature freezing baths using freezing and melting of pure components to provide a constant temperature as, for examples, pure water freezing and melting to maintain 0°C., pure benzene freezing and melting to maintain 5.5°C., or pure benzotrichloride freezing and melting to maintain −4.8°C. The second pertains to solutions of inorganic salts and water which form eutectic freezing mixtures used as heat-sink fluids in thermal or heat-sink structures such as those described in the copending application identified above. Examples of inorganic salts forming eutectic mixtures are sodium borate and water which contains 1.09 weight percent sodium borate and freezes and melts at −0.45°C., mono basic sodium phosphate and water which contains 1.2 weight percent sodium phosphate and freezes and melts at −0.5°C., sodium sulfate and water which contains 3.8 weight percent of sodium sulfate and freezes and melts at −1.2° C., sodium carbonate and water which contains 5.93 weight percent sodium carbonate and freezes and melts at −2.1°C., potassium chloride and water which contains 19.54 weight percent of potassium chloride and freezes and melts at −10.7°C., a sodium chloride and water which contains 22.42 weight percent sodium chloride and freezes and melts at −21.2°C.

SUMMARY

In general, the compositions of the present invention are single-phase, liquid, water-rich solutions containing at least one organic component which solutions will form a solid hydrate. These compositions are particularly suited for use as heat-sink fluids in thermal or heat-sink structures such as those described in the previously identified copending application entitled "Trafficked Surfaces" by John S. Best, Ser. No. 112,635 filed Feb. 4, 1971, which is herein fully incorporated by reference. The thermal or heat-sink structures, in which the present compositions may be utilized, are generally designed to effect the temperature of natural environmental elements and/or man-made contructions adjacent such thermal or heat-sink structures as, for example, where they are used in building foundations, road or railroad beds, airport runways, transport pipelines, banks of natural bodies of water or retaining side walls of shipping channels, outdoor sport or recreation areas and the like.

The compositions of the present invention are readily produced by dissolution of the required organic components in water utilizing known mixing means. Mole proportions of the organic components and water should be selected which provide balanced hydrates after freezing. A balanced hydrate is defined as one where the hydrate composition contains substantially that amount needed to form the same without appreciable excess organic component or water as, for example, when one mole of organic component is mixed with ten moles of water to form a decahydrate. The invariant melting and freezing temperatures of the present compositions may be further regulated by utilizing a mixture of two or more organic components which form clathrate hydrates. Furthermore, the invariant melting and freezing temperatures of the present compositions may be depressed by addition of inorganic salts to their solutions in any desired amount up to the point of full saturation. The physical characteristics of the compositions are those of mobile, single-phase fluids which freeze to yield homogeneous crystalline ice-like solids.

DESCRIPTION OF THE PREFERRED EMBODIMENTS

For use in heat-sink structures, the compositions of the present invention are considerably more advantageous than pure organic compounds because of a considerably larger release or absorption of latent heat during liquid-solid phase changes. For example, the composition comprising 1 mole of tetrahydrofuran and 17 moles of water has a freezing or melting heat exchange of about 63 calories/cm.$^3$ at 4.4°C., whereas pure benzene exhibits a freezing or melting heat exchange of about 27 calories/cm.$^3$ at 5.5°C. This means that the heat capacity of a thermal or heat-sink structure of a given volume of the tetrahydrofuran-water composition will store more than twice the amount of heat that could be stored by pure benzene.

The compositions of the present invention are considerably more advantageous than water or the aqueous inorganic salt eutectic compositions when used as heat-sink fluids because it has been found that they have considerably smaller volume expansions on freezing. For example, the aqueous composition comprising 1 mole of tetrahydrofuran, 1 mole of tetrahydropyran and 34 moles of water expands about 2 percent on freezing whereas water and the aqueous inorganic salt eutectic compositions expand about 9 percent on freezing. Furthermore, a number of the compositions of the present invention contract on freezing which is particularly advantageous for their use in thermal or heat-sink structures since they will not cause mechanical rupture of the same. Some examples of compositions which contract on freezing are solutions comprising 1 mole of pinacol (2,3-dimethylbutane-2,3-diol) with 6 moles of water which composition freezes and melts at about 45.0°C., 1 mole of butane-2,3-diol with 6 moles of water which composition freezes and melts at about 14.0°C., 1 mole of chloral hydrate with 6 moles of water which composition freezes at about −1.4°C., 1 mole of t-butanol with 2 moles of water which composition freezes at about 0.4°C., and 1 mole of t-butanol with 1.976 moles of water and 0.012 mole of ammonium fluoride which composition freezes at about −0.3°C.

Another advantage of the compositions of the present invention is that some can be used to maintain thermal or heat-sink structures at invariant temperatures above 0°C. which is not possible with water and aqueous inorganic eutectic mixtures. Aqueous organic hydrate compositions suitable for heat-sink fluids in thermal or heat-sink structures operating above 0°C. are, for example, solutions comprising 1 mole of tetrahydrofuran and 17 moles of water which composition freezes at 4.4°C., 1 mole of cyclobutanone and 17 moles of water which composition freezes at 0.6°C., 1 mole of tetrahydrofuran plus 1 mole of 2,5-dihydrofuran and 34 moles of water which composition freezes at 2.0°C., 1 mole of tetrahydrofuran plus 1 mole of 1,3-dioxolane and 34 moles of water which composition freezes at about 1.0°C., 1 mole of pinacol and 6 moles of water which composition freezes at about 45.0°C., and 1 mole of butane-2,3-diol and 6 moles of water which composition freezes at about 14.0°C.

A further advantage of the present compositions is the ability to preselect their temperatures of freezing or melting within prescribed limits. Obtaining a preselected temperature of freezing and melting can be realized in four different ways which will now be described.

When two hydrate-forming organic components, A and B, each form clathrate heptadecahydrates which freeze and melt congruently at temperatures $T_A$ and $T_B$, respectively, it is possible to design organic hydrate compositions containing components A plus B which will freeze and melt at any preselected temperature between $T_A$ and $T_B$. For example, tetrahydrofuran and 1,3-dioxolane each form heptadecahydrates which freeze and melt congruently at 4.6 and −2.1°C., respectively. This enables the design of organic hydrate compositions comprising $x$ mole of tetrahydrofuran ($x$ being less than one) plus ($1-x$) mole of 1,3-dioxolane together with 17 moles of water which compositions freezes and melts within the temperature range of about 4.6°C. to −2.1°C. As $x$ decreases from 1 to 0 the freezing and melting temperature of the organic hydrate composition decreases from 4.6° to −2.1°C. Thus, it has been found that in order to obtain an organic hydrate composition which freezes and melts at −0.2°C., the designed organic hydrate composition comprises 0.15 mole of tetrahydrofuran plus 0.85 mole of 1,3-dioxolane plus 17 moles of water. In like manner, tetrahydrofuran and propylene oxide form heptadecahydrates which freeze and melt congruently at 4.6°C. and −4.4°C., respectively. In order to obtain a composition with an invariant freezing and melting temperature useful as a heat-sink fluid which is required to operate at 2°C. the designed organic hydrate composition thereof will comprise 0.48 mole of tetrahydrofuran plus 0.52 mole of propylene oxide plus 17 moles of water.

There are many organic compounds which will form clathrate heptadecahydrate as, for example, tetrahydrofuran having a hydrate freezing and melting temperature of 4.6°C., cyclobutanone having a hydrate freezing and melting temperature of 1.0°C., 2,5-dihydrofuran having a hydrate freezing and melting temperature of 0.0°C., tetrahydropyran having a hydrate freezing and melting temperature of −0.8°C., 1,3-dioxolane having a hydrate freezing and melting temperature of −2.1°C., and propylene oxide having a hydrate freezing and melting temperature of −4.4°C. Thus, organic hydrate compositions can be designed from these organic compounds for use as heat-sink fluids operating at predetermined temperatures in the range of 4.6°C. to −4.4°C.

Another way of obtaining preselected invariant temperatures of freezing and melting in aqueous organic compositions useful as heat-sink fluids is to dissolve an inorganic salt therein in any desired amount up to the point of full saturation of the aqueous organic composition. Consider the aqueous organic composition of an organic compound A which forms an organic hydrate with an invariant melting point $T_A$. The freezing and melting temperature can be depressed below $T_A$ and maintained therebelow by the addition of an inorganic salt up to the saturation point of the organic hydrate composition. Such systems are particularly suitable for use as heat-sink fluids. The greater the solubility of the inorganic salt in the organic hydrate composition, the greater will be the depression of the freezing and melting temperature of the hydrate below $T_A$. A discontinuous series of invariant melting and freezing temperatures can be obtained with a given organic hydrate-forming component by using a series of increasingly soluble inorganic salts.

For example, the heptadecahydrate of tetrahydrofuran comprising 1 mole of tetrahydrofuran and 17 moles of water freezes and melts at 4.6°C. When the hydrate composition is saturated with potassium chloride the invariant freezing and melting temperature is lowered to −3.3°C. The invariant freezing and melting temperature of this organic hydrate composition is lowered by saturation with other specified inorganic salts as follows: potassium aluminum sulfate, 4.3°C.; sodium sulfate, 3.8°C.; sodium carbonate, 3.6°C.; magnesium sulfate, 3.5°C.; potassium oxalate, 2.9°C.; potassium bicarbonate, 1.9°C. and sodium sulfide, −2.7°C. In like manner, the freezing and melting temperature of other aqueous organic compositions can also be depressed by the use of inorganic salts.

When hydrate-forming organic compounds, A and B, each form organic hydrate compositions which freeze and melt congruently at temperatures $T_A$ and $T_B$, respectively, it is possible to design organic hydrate compositions containing components A plus B which will freeze and melt at any preselected temperature between $T_A$ and $T_B$. If such organic hydrate compositions containing components A plus B are saturated with an inorganic salt, the freezing and melting temperature will lie between $T'_A$ and $T'_B$ wherein $T'_A$ is lower than $T_A$ and $T'_B$ is lower than $T_B$. For example, an organic hydrate composition comprising 0.5 mole tetrahydrofuran plus 0.5 mole, 2,5-dihydrofuran plus 17 moles of water, freezes and melts at 3.8°C. When this same composition is saturated with potassium bicarbonate, it freezes and melts at 0.5°C. Other binary systems of hydrate-forming organic compounds exhibit the same phenomenon.

When a hydrate-forming organic compound A forms an aqueous composition which freezes or melts invariantly at $T_A$, it has been found that organic hydrate compositions comprising 1 mole of A plus $(m-d)$ moles of water plus $d/2$ moles of ammonium fluoride are formed which freeze and melt invariantly at temperatures lower than $T_A$. Thus, by controlling $d$ the freezing and melting temperature of these compositions can be depressed to a predetermined level below $T_A$. In these compositions each mole of ammonium fluoride replaces 2 moles of water in the organic hydrate crystalline lattice of the composition. For example, the organic hydrate composition comprising 1 mole of pinacol plus 6 moles of water freezes and melts at 45.0°C. to form the solid hydrate composition. When this composition is modified to comprise 1 mole of pinacol plus 5.708 moles of water plus 0.146 mole of ammonium fluoride the invariant freezing and melting temperature is reduced to 43.2°C. and the equilibrium solid is isomorphous with ammonium fluoride replacing water. In like manner, other hydrate-forming organic compounds exhibit a freezing and melting temperature depression when ammonium fluoride is used to replace water in their compositions.

The following Tables I and II illustrate the manner in which the principles of the invention are applied but are not to be construed as limiting the scope of the invention. Table I illustrates specific organic hydrate compositions and their invariant freezing and melting temperatures. Table II illustrates the more general formulas of organic hydrate compositions found in Table I.

TABLE I

| Sample | Organic Hydrate Compositions (Mole Ratio) | Saturated with Inorganic Salt(s) | Freezing-Melting Temp. (°C) |
|---|---|---|---|
| 1 | Pinacol·6H$_2$O | | 45.0 |
| 2 | Pinacol·5.708H$_2$O·0.146NH$_4$F | | 43.2 |
| 3 | 2,3-Butanediol·6H$_2$O | | 14.8 |
| 4 | 2,3-Butanediol·6H$_2$O | KCl | 10.9 |
| 5 | 2,3-Butanediol·5.708H$_2$O·0.146NH$_4$F | | 13.5 |
| 6 | Chloral hydrate·6H$_2$O | | −1.3 |
| 7 | Chloral hydrate·6H$_2$O | Na$_2$SO$_4$·10H$_2$O | −1.4 |
| 8 | Chloral hydrate·6H$_2$O | K$_2$(COO)$_2$·H$_2$O | −4.4 |
| 9 | Chloral hydrate·6H$_2$O | KCl | −6.8 |
| 10 | Chloral hydrate·5.708H$_2$O·0.146NH$_4$F | | −3.1 |
| 11 | Tertiary butyl alcohol·2H$_2$O | | 0.4 |
| 12 | Tertiary butyl alcohol·2H$_2$O | KHCO$_3$ | 0.2 |
| 13 | Tertiary butyl alcohol·1.976H$_2$O·0.012NH$_4$F | | 0.0 |
| 14 | Tertiary butyl alcohol·1.956H$_2$O·0.022NH$_4$F | | −0.7 |
| 15 | Tetrahydrofuran·17H$_2$O | | 4.6 |
| 16 | Tetrahydrofuran·17H$_2$O | KAl(SO$_4$)$_2$·12H$_2$O | 4.3 |
| 17 | Tetrahydrofuran·17H$_2$O | Na$_2$SO$_4$·10H$_2$O | 3.8 |
| 18 | Tetrahydrofuran·17H$_2$O | Na$_2$CO$_3$·10H$_2$O | 3.6 |
| 19 | Tetrahydrofuran·17H$_2$O | MgSO$_4$·7H$_2$O | 3.5 |
| 20 | Tetrahydrofuran·17H$_2$O | K$_2$(COO)$_2$·H$_2$O | 2.9 |
| 21 | Tetrahydrofuran·17H$_2$O | KHCO$_3$ | 1.9 |
| 22 | Tetrahydrofuran·17H$_2$O | Na$_2$S·9H$_2$O | −2.7 |
| 23 | Tetrahydrofuran·17H$_2$O | KCl | −3.3 |
| 24 | Tetrahydrofuran·16.172H$_2$O·0.414NH$_4$F | | 3.4 |
| 25 | Cyclobutanone·17H$_2$O | | 1.0 |
| 26 | 0.5 Cyclobutanone·0.5 Tetrahydrofuran·17H$_2$O | | 3.0 |
| 27 | Tetrahydrofuran·17H$_2$O | | 4.6 |
| 28 | 2,5-Dihydrofuran·17H$_2$O | | 0.0 |
| 29 | 2,5-Dihydrofuran·17H$_2$O | KHCO$_3$ | −2.9 |
| 30 | 0.5 2,5-Dihydrofuran·0.5 Tetrahydrofuran·17H$_2$O | | 3.8 |
| 31 | 0.5 2,5-Dihydrofuran·0.5 Tetrahydrofuran·17H$_2$O | KHCO$_3$ | 0.5 |
| 32 | 0.5 Tetrahydropyran·0.5 Tetrahydrofuran·17H$_2$O | | 3.0 |
| 33 | 0.25 Tetrahydropyran·0.75 Tetrahydrofuran·17H$_2$O | | 4.1 |
| 34 | Tetrahydrofuran·17H$_2$O | | 4.6 |
| 35 | 1,3-Dioxolane·17H$_2$O | | −2.1 |
| 36 | 1,3-Dioxolane·17H$_2$O | K$_2$(COO)$_2$·H$_2$O | −4.1 |
| 37 | 0.75 1,3-Dioxolane·0.25 Tetrahydrofuran·17H$_2$O | | 0.8 |
| 38 | 0.5 1,3-Dioxolane·0.5 Tetrahydrofuran·17H$_2$O | | 2.5 |
| 39 | 0.25 1,3-Dioxolane·0.75 Tetrahydrofuran·17H$_2$O | | 3.9 |
| 40 | 0.5 1,3-Dioxolane·0.5 Tetrahydrofuran·17H$_2$O | KHCO$_3$ | −0.2 |
| 41 | 0.5 1,3-Dioxolane·0.5 2,5-Dihydrofuran·17H$_2$O | | −0.8 |
| 42 | Propylene oxide·17H$_2$O | | −4.4 |
| 43 | 0.67 Propylene oxide·0.33 Tetrahydrofuran·17H$_2$O | | 0.4 |
| 44 | 0.5 Propylene oxide·0.5 Tetrahydrofuran·17H$_2$O | | 2.3 |
| 45 | 0.33 Propylene oxide·0.67 Tetrahydrofuran·17H$_2$O | | 3.2 |
| 46 | Tetrahydrofuran·17H$_2$O | | 4.6 |

TABLE II

| Sample | Organic Hydrate Compositions (Mole ratio) | $x$ Range (Moles) | | Freezing — Melting Temperature Range (°C) | |
|---|---|---|---|---|---|
| 1 | Pinacol·(6.0−$x$) H$_2$O·0.5 $x$ NH$_4$F | 0 | >0.292 | 45.0 | <43.2 |
| 2 | 2,3-Butanediol·(6.0 −$x$) H$_2$O·0.5 $x$ NH$_4$F | 0 | >0.292 | 14.8 | <13.5 |
| 3 | Chloral hydrate·(6.0 −$x$) H$_2$O·0.5 $x$ NH$_4$F | 0 | >0.292 | −1.3 | <−3.1 |
| 4 | Tertiary butyl alcohol·(2.0−$x$) H$_2$O·0.5 $x$ NH$_4$F | 0 | >0.044 | 0.4 | <−0.7 |
| 5 | Tetrahydrofuran·(17.0−$x$) H$_2$O·0.5 $x$ NH$_4$F | 0 | >0.828 | 4.6 | < 3.4 |
| 6 | Cyclobutanone·(17.0−$x$) H$_2$O·0.5 $x$ NH$_4$F | >0 | | | < 1.0 |
| 7 | 2,5-Dihydrofuran·(17.0−$x$) H$_2$O·0.5 $x$ NH$_4$F | >0 | | | < 0.0 |
| 8 | 1,3-Dioxolane·(17.0−$x$) H$_2$O·0.5 $x$ NH$_4$F | >0 | | | <−2.1 |

TABLE II —Continued

| Sample | Organic Hydrate Compositions (Mole ratio) | x Range (Moles) | | Freezing — Melting Temperature Range (°C) | |
| --- | --- | --- | --- | --- | --- |
| 9  | Propylene oxide $(17.0-x)$ H$_2$O 0.5 x NH$_4$F            | >0  |      | <−4.4 |      |
| 10 | x Tetrahydrofuran $(1-x)$ Cyclobutanone·17H$_2$O          | 1.0 | 0    | 4.6   | 1.0  |
| 11 | x Tetrahydrofuran $(1-x)$ 2,5-Dihydrofuran·17H$_2$O       | 1.0 | 0    | 4.6   | 0.0  |
| 12 | x Tetrahydrofuran $(1-x)$ Tetrahydropyran·17H$_2$O        | 1.0 | <0.5 | 4.6   | <3.0 |
| 13 | x Tetrahydrofuran $(1-x)$ 1,3-Dioxolane·17H$_2$O          | 1.0 | 0    | 4.6   | −2.1 |
| 14 | x Tetrahydrofuran $(1-x)$ Propylene oxide·17H$_2$O        | 1.0 | 0    | 4.6   | −4.4 |
| 15 | x Cyclobutanone $(1-x)$ 2,5-Dihydrofuran·17H$_2$O         | 1.0 | 0    | 1.0   | 0.0  |
| 16 | x Cyclobutanone $(1-x)$ Tetrahydropyran·17H$_2$O          | 1.0 | 0.5  | 1.0   | 0.5  |
| 17 | x Cyclobutanone $(1-x)$ 1,3-Dioxolane·17H$_2$O            | 1.0 | 0    | 1.0   | −2.1 |
| 18 | x Cyclobutanone $(1-x)$ Propylene oxide·17H$_2$O          | 1.0 | 0    | 1.0   | −4.4 |
| 19 | x 2,5-Dihydrofuran $(1-x)$ Tetrahydropyran·17H$_2$O       | 1.0 | 0.5  | 0.0   | −0.2 |
| 20 | x 2,5-Dihydrofuran $(1-x)$ 1,3-Dioxolane·17H$_2$O         | 1.0 | 0    | 0.0   | −2.1 |
| 21 | x 2,5-Dihydrofuran $(1-x)$ Propylene oxide·17H$_2$O       | 1.0 | 0    | 0.0   | −4.4 |
| 22 | x Tetrahydropyran $(1-x)$ 1,3-Dioxolane·17H$_2$O          | 0.5 | 0    | −1.2  | −2.1 |
| 23 | x Tetrahydropyran $(1-x)$ Propylene oxide·17H$_2$O        | 0.5 | 0    | −1.7  | −4.4 |
| 24 | x 1,3-Dioxolane $(1-x)$ Propylene oxide·17H$_2$O          | 1.0 | 0    | −2.1  | −4.4 |

Those compositions comprising a single organic compound plus water are substantially made with the composition shown in Table I and their invariant freezing and melting temperatures are as shown. When it is desired to use these compositions as heat-sink fluid in thermal or heat-sink structures, a specific system can be chosen to give the required freezing and melting temperature for the designed structure. Compositions comprising a single organic compound plus water saturated with an inorganic salt are substantially made with the organic compound and water mole ratios shown in Table I. In like manner, when these compositions are used as heat-sink fluids, they can be designed to give the desired freezing and melting temperature required.

Compositions comprising a single organic compound plus water plus ammonium fluoride illustrated in Table I are particular examples of more general compositions shown in Table II. The moles of ammonium fluoride utilized, as defined by x in Table II, may be varied continuously to obtain the desired freezing and melting temperature. Similar systems of two or more hydrate-forming organic compounds, water and ammonium fluoride can be designed to give a predetermined freezing and melting temperature by the appropriate choice of x. The ranges of x shown in Table II have been found experimentally and thus should be regarded as minimum ranges thereof. Larger values of x may be possible with the upper value being limited only by the formation of a second liquid phase.

Compositions comprising two organic hydrate compounds plus water saturated with an inorganic salt, examples of which are shown in Samples 31 and 40 of Table I, can be defined by the general composition comprising x moles of compound A, wherein x is less than 1, plus (1−x) moles of compound B plus 17 moles of water saturated with an inorganic salt S. Compounds A and B are hydrate formers which may be selected from the group comprising tetrahydrofuran, cyclobutanone, 2,5-dihydrofuran, tetrahydropyran, 1,3-dioxolane and propylene oxide. Saturation of the aqueous organic compositions by inorganic salts S leads to a constant depression in the freezing and melting temperatures by a ΔT°C. Several inorganic salts S and their associated constant freezing and melting point depressions, ΔT°C., are potassium aluminum sulfate, −0.3°C.; sodium sulfate, −0.8°C.; sodium carbonate, −1.0°C.; magnesium sulfate, −1.1°C.; potassium oxalate, −1.7°C.; potassium bicarbonate, −2.7°C.; sodium sulfide, −7.3°C. and potassium chloride, −7.9°C. This list of inorganic salts is for illustrative purposes only and should not be considered as limiting since other salts can be used to saturate organic hydrate compositions to depress their invariant melting and freezing temperatures.

If desired, an estimate can be made of the expected freezing and melting temperature of any organic hydrate composition when the same is saturated with a specific inorganic salt. For example, Sample 40 of Table I was experimentally found to have a freezing and melting temperature of about −0.2°C. To estimate this freezing and melting temperature we add the depression constant of −2.7°C. for saturation with potassium bicarbonate to the freezing and melting temperature 2.5°C. of Sample 38 which gives the same freezing and melting temperature of −0.2°C. In addition, by choosing a particular inorganic salt to saturate ternary systems, hydrate compositions having a continuous range of invariant freezing and melting temperatures can be obtained by varying the mole ratio of organic compounds A and B. For example, if the inorganic salt is potassium chloride, the organic compound A is tetrahydrofuran and the organic compound B is propylene oxide, the invariant freezing and melting temperature can be varied from −3.3°C. for 1 mole of tetrahydrofuran to −12.3°C. for 0 moles of tetrahydrofuran. In like manner, an invariant range of freezing and melting temperatures can be achieved for aqueous organic compositions of organic components A and B when ammonium fluoride is used to depress the freezing and melting temperatures of the same.

Other hydrate-forming organic compounds, their degree of hydration in moles of water per mole of organic compound, and the freezing and melting temperatures in °C. of their hydrates, which are considered to be within the scope of the present invention are ethylamine, 5.5 moles, −7.5°C.; dimethylamine, 6.9 moles, −16.9°C.; trimethylamine, 10.0 moles, 5.9°C.; n-propylamine, 8.0 moles, −13.5°C.; isopropylamine, 7.5 moles, −4.2°C.; diethylamine, 6.8 moles, −6.6°C.; diethylamine, 8.66 moles, −7.3°C.; tributylamine, 9.75 moles, −1.0°C. and trimethylene oxide, 17.0 moles, −13.1°C.

While certain representative embodiments and details have been shown for the purpose of illustrating the invention, it will be apparent to those skilled in the art that various changes and modifications can be made therein without departing from the spirit and scope of the invention. For example, aqueous organic compositions useful as heat-sink fluids in thermal or heat-sink structures can be made from a large variety of organic compounds which are hydrate formers and from a large variety from inorganic salts which can be utilized to depress the invariant freezing and melting temperatures of the aqueous organic compositions.

What is claimed is:

1. A single-phase heat-sink fluid or solution adapted for use in a thermal or heat-sink structure consisting essentially of water, at least one hydrate forming organic component selected from the group consisting of pinacol, 2,3-butanediol, chloral hydrate, tertiary butyl alcohol, tetrahydrofuran, cyclobutanone, 2,5-dihydrofuran, tetrahydropyran, 1,3-dioxolane, propylene oxide, ethylamine, dimethylamine, trimethylamine, n-propylamine, isopropylamine, diethylamine, triethylamine, tertiary butylamine, trimethylene oxide and mixtures thereof, said organic component and water in mole proportions capable of forming a balanced hydrate which freezes to form a homogeneous, crystalline, ice-like solid, and at least one inorganic salt in an amount up to the point of full saturation which lowers the melting and freezing temperature of said hydrate, said fluid having a relatively large latent heat capacity at its melting and freezing phase change which supplies heat to and/or removes heat from said thermal or heat-sink structure.

2. The heat-sink fluid or solution of claim 1 wherein said inorganic salt is or includes ammonium fluoride which lowers the melting and freezing temperature of the same, one mole part of said ammonium fluoride replacing two mole parts of water in the hydrate which forms an isomorphous equilibrium crystalline solid phase at its melting and freezing temperature.

3. The heat-sink fluid or solution of claim 1 wherein said inorganic salt is selected from the group consisting of potassium chloride, potassium bicarbonate, sodium sulfate, potassium aluminum sulfate, sodium carbonate, magnesium sulfate, potassium oxalate, sodium sulfide, and mixtures thereof.

4. In combination with a thermal or heat-sink structure, said thermal or heat-sink structure having a hollow body containing a heat-sink fluid or solution, said heat-sink fluid or solution having a relatively large latent heat capacity at its melting and freezing phase change which supplies heat to and/or removes heat from said thermal or heat-sink structure, the improvement which comprises, a single-phase heat-sink fluid or solution consisting essentially of water and at least one hydrate forming organic component, said organic component and water in mole proportions capable of forming a balanced hydrate which freezes to form a homogeneous, crystalline, ice-like solid.

5. The thermal or heat-sink structure of claim 4 wherein said fluid or solution includes an inorganic salt in an amount up to the point of full saturation which lowers the melting and freezing temperature of the same.

6. The thermal or heat-sink structure of claim 4 wherein said fluid or solution includes ammonium fluoride which lowers the melting and freezing temperature of the same, one mole part of said ammonium fluoride replacing two mole parts of water in the hydrate which forms an isomorphous equilibrium crystalline solid phase at its melting and freezing temperature.

7. The thermal or heat-sink structure of claim 4 wherein said organic component is selected from the group consisting of pinacol, 2,3-butanediol, chloral hydrate, tertiary butyl alcohol, tetrahydrofuran, cyclobutanone, 2,5-dihydrofuran, tetrahydropyran, 1,3-dioxolane, propylene oxide, ethylamine, dimethylamine, trimethylamine, n-propylamine, isopropylamine, diethylamine, triethylamine, tertiary butylamine, trimethylene oxide and mixtures thereof.

8. The thermal or heat-sink structure of claim 7 wherein said fluid or solution includes an inorganic salt in an amount up to the point of full saturation selected from the group consisting of potassium chloride, potassium bicarbonate, sodium sulfate, potassium aluminum sulfate, sodium carbonate, magnesium sulfate, potassium oxalate, sodium sulfide, and mixtures thereof.

9. A method for making a thermal or heat-sink structure which includes a single-phase heat-sink fluid or solution, comprising the steps of;
   a. mixing water and at least one hydrate forming organic component in mole proportions such that a balanced hydrate is formed;
   b. placing said hydrate in said thermal or heat-sink structure whereby said hydrate having a relatively large latent heat capacity at its melting and freezing phase change supplies heat to and/or removes heat from said thermal or heat-sink structure.

10. The method of claim 9 wherein step (a) includes the additional step of mixing an inorganic salt in an amount up to the point of full saturation with said hydrate to lower the melting and freezing temperature of the same.

11. The method of claim 9 wherein step (a) includes mixing ammonium fluoride with said water and organic component to form said hydrate, one mole part of the ammonium fluoride replacing two mole parts of the water in the hydrate which forms an isomorphous equilibrium crystalline solid phase at its melting and freezing temperature.

12. The method of claim 9 wherein said organic component is selected from the group consisting of pinacol, 2,3-butanediol, chloral hydrate, tertiary butyl alcohol, tetrahydrofuran, cyclobutanone, 2,5-dihydrofuran, tetrahydropyran, 1,3-dioxolane, propylene oxide, ethylamine, dimethylamine, trimethylamine, n-propylamine, isopropylamine, diethylamine, triethylamine, tertiary butylamine, trimethylene oxide and mixtures thereof.

13. The method of claim 12 wherein said fluid or solution includes an inorganic salt in an amount up to the point of full saturation selected from the group consisting of potassium chloride, potassium bicarbonate, sodium sulfate, potassium aluminum sulfate, sodium carbonate, magnesium sulfate, potassium oxalate, sodium sulfide, and mixtures thereof.

* * * * *